United States Patent Office 3,624,908
Patented Dec. 7, 1971

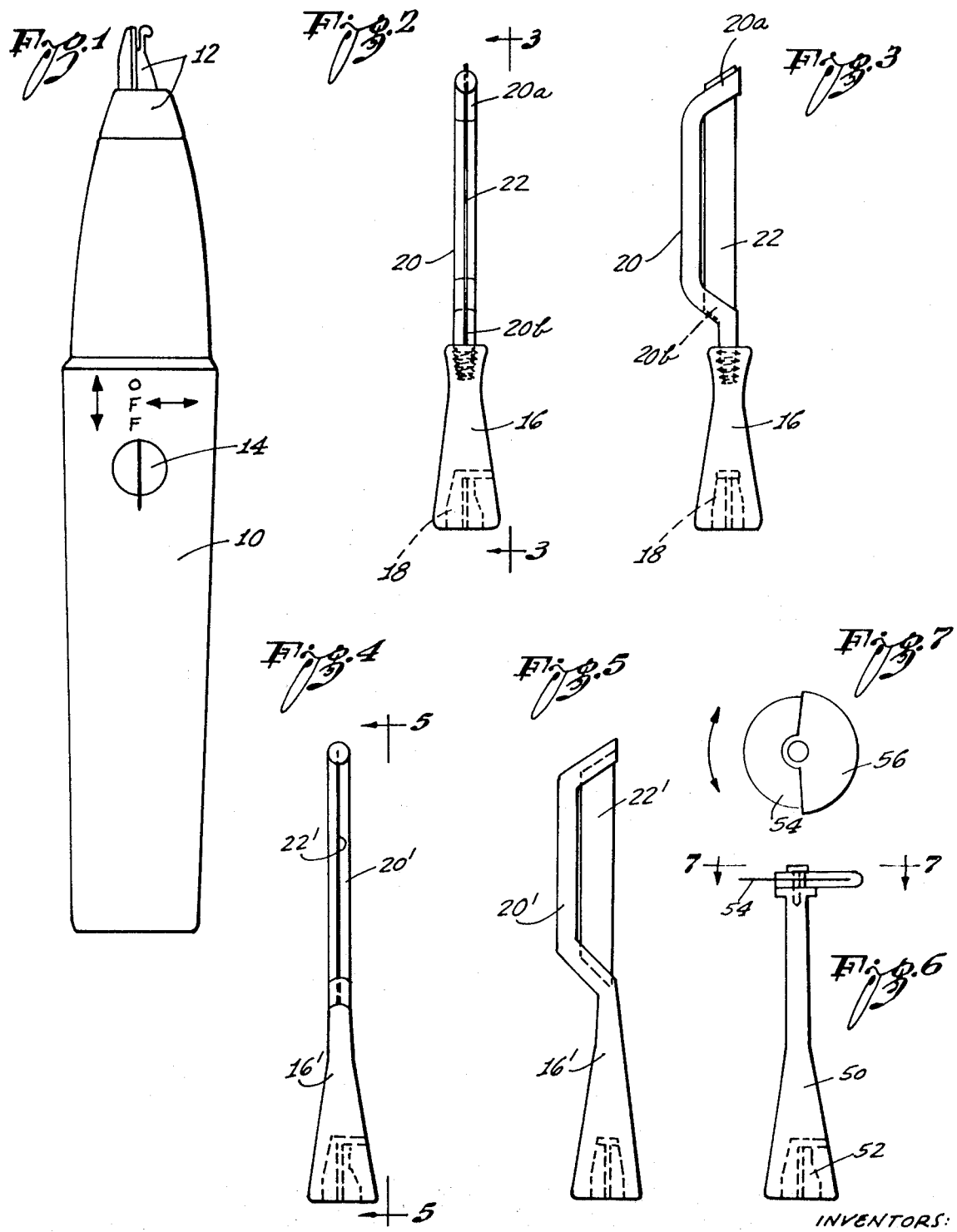

3,624,908
AUTOMATIC DENTAL STRIPPER INSTRUMENT
Robert M. Ricketts, Pacific Palisades, and John Donald Tichenor, Tarzana, Calif., assignors to Dome, Inc., Pacific Palisades, Calif.
Filed Jan. 26, 1970, Ser. No. 5,626
Int. Cl. A61c 3/06
U.S. Cl. 32—58
2 Claims

ABSTRACT OF THE DISCLOSURE

An improved dental tool is provided which imparts reciprocating movement to an abrasive or polishing strip, saw or the like, and which may be used for polishing fillings, or separating, excising and cleaning teeth, or for other appropriate dental stripping purposes. The tool includes a handle which encloses an electrically powered socket, the socket being adapted removably to receive the shank of a disposable plastic frame in which the abrasive strip, or equivalent element, is releasably mounted. A rechargeable battery power source may also be housed within the handle.

BACKGROUND OF THE INVENTION

It is usual in the art for the dentist to use a hand-operated element, known as a stripper, for polishing interproximal surfaces of fillings in human teeth, for sawing through contracts, for cutting down dental bridges, for cutting off or polishing down overhanging or rough interproximal fillings, or for any other purposes where sawing, filing, smoothing, or polishing is necessary on the teeth.

The present invention provides an improved, simple and unique electrically powered tool, whereby the process described in the preceding paragraph may be mechanized. The tool of the invention is constructed, for example, for use by dentists or dental hygienists, or similar persons, for polishing, removal of placques, films, stains, or other foreign substances on the interproximal surfaces of the teeth.

The handle portion of the improved dental tool of the present invention may be similar to the handle portion of the prior art electric toothbrush, so as to impart a desired reciprocal movement to the element releasably supported in the power driven socket of the handle. The element itself, for example, may include a shank configured to be removably inserted into the power driven socket of the handle, and it may also include a disposable plastic frame which is threaded, or otherwise removably mounted into the end of the shank. The saw or abrasive element, for example, is supported in the removable plastic frame, and it also may be releasable.

In the practice of the present invention, a quantity of the frames and abrasive strip elements, are purchased by the dentist, and are used on the individual patients. The abrasive elements themselves may be disposed of after each use, and a new element mounted on the plastic frame, or the frame and abrasive element may be disposable as a unit after each use.

BRIEF DESCRIPTION OF THE DRAWINGS

FIG. 1 is a perspective representation of a handle structure which includes a power operated reciprocal socket, and which is adaptable for use as a part of the stripper instrument of the present invention;

FIG. 2 is a side elevation of a frame element which is removably received in the socket of the handle of FIG. 1, as one embodiment of the invention, and which, in turn, releasably supports an abrasive strip, or its equivalent;

FIG. 3 is another view of the frame element of FIG. 2 taken substantially along the line 3—3 of FIG. 2, and represents the element of FIG. 2 turned through 90° about its longitudinal axis;

FIG. 4 is a side view of a disposable frame element and abrasive strip representing a second embodiment of the invention;

FIG. 5 is a view of the unit of FIG. 4 turned through 90° about its longitudinal axis;

FIG. 6 is a side view of a disposable frame and disc shaped element which is particularly useful in stripping or polishing molars; and FIG. 7 is an end view of the unit of FIG. 6.

DETAILED DESCRIPTION OF THE ILLUSTRATED EMBODIMENTS

As mentioned above, the improved unit of the present invention may incorporate an electric toothbrush type of handle 10 shown in FIG. 1, and which may be of a type similar, for example, to the units described in Pats. 3,156,804 and 3,142,852.

A power driven socket 12 is mounted at the upper end of the handle 10, and the handle includes an appropriate electrically energized drive means for the power driven socket 12, such as described in the aforesaid patents, and which imparts a reciprocal motion to the socket 12 with respect to the longitudinal axis of the handle. The handle may also house an appropriate rechargeable electric power source, such as a rechargeable battery, for the drive means, and the drive means may be selectively energized by operation of a switch 14 on the side of the handle.

Further description of the mechanism of the handle 10 is believed to be unnecessary, since such mechanisms are fully described in the aforesaid patents. In the practice of the present invention, a plastic shank 16, such as shown in FIGS. 2 and 3 is provided. The shank is similar to that used with present day toothbrush elements, and it is intended to be releasably received in the socket 12 by means of a socket 18 which engages a mating latch within the power driven socket 12. This permits the plastic shank 16 to be firmly held within the socket 12, and to be moved reciprocally up and down with respect to the handle as the socket is moved by its drive means. The shank 16 may be released from the socket 12, merely by pulling it out of engagement with the latch in the socket, as is well known.

A plastic frame 20 in the embodiment of FIGS. 2 and 3 is threadably, or otherwise removably received in the upper end of the shank 16. A strip of abrasive material, or its equivalent, designated 22 is supported in the frame, as shown in FIGS. 2 and 3. The frame 20 may have a slit 20a at its upper end through which the abrasive strip extends, as shown in FIG. 3. The lower end or the frame 20 provides a vise 20b for the strip 22, and the vise tightens as the frame 20 is screwed down into the shank 16.

As mentioned above, the embodiment of FIGS. 1, 2 and 3 is particularly adaptable as a mechanized stripper for incisors. The strip 22 may be abrasive on one or both sides, depending upon the use to which it is to be placed. Moreover, the strip 22 may be replaced by a saw element, or any other appropriate element which is to be reciprocated by the tool.

The embodiment of FIGS. 4 and 5 is generally similar to the embodiment of FIGS. 2 and 3. In the latter embodiment, however, the abrasive strip 22' is molded to the plastic frame 20' and both are disposable as a unit, together with the plastic shank 16' which is integral with the frame.

The embodiment of FIGS. 6 and 7 is particularly useful in conjunction with molars. It includes a shank 50 which, in turn, includes a socket 52 at its lower end which is received by the power socket 12 of the handle unit of FIG. 1. The handle unit may also include an internal drive mechanism of the type described, for example, in Patent 3,187,360, and which provides a reciprocal turning movement to the shank 50. The latter drive mechanism may be energized, for example, by turning the switch 14 to a second "on" position. An abrasive disc 54 is mounted on the end of the shank 50, as well as a guard 56. The embodiment of FIG. 4 is particularly adaptable for use with molars, since it provides a desired angular rocking action to the abrasive disc 54.

An improved mechanized dental stripper tool is provided, therefore, which is relatively inexpensive, and which uses replaceable elements, as described above, so as to facilitate the use and operation of the unit, and so as to make its use economically feasible.

What is claimed is:

1. A dental tool for removing foreign substances from the interproximal surfaces of a patient's teeth, and which includes the combination with a handle containing electrically energized drive means and having a mechanically driven reciprocating socket therein mechanically coupled to said drive means to be reciprocally driven thereby, of a disposable reciprocating holder and an abrasive strip member, and which holder is releasably received in said socket, said holder including: a shank shaped to be releasably received in the aforesaid socket; a frame for said abrasive member affixed to said shank, said frame and said shank being integral with one another and composed of a plastic material, said frame having a generally U-shaped configuration, and said abrasive strip member being molded to said frame in axial alignment with the longitudinal axis of said handle and directly adjacent the central portion of said frame so that said frame serves to limit the penetration of said abrasive strip member between the teeth of the patient.

2. The combination defined in claim 1, in which said tol holder is supported by said socket for reciprocating linear motion along the longitudinal axis of said handle.

References Cited

UNITED STATES PATENTS

| | | | |
|---|---|---|---|
| 1,184,122 | 5/1916 | Parmiter et al. | 32—58 X |
| 1,880,617 | 10/1932 | White | 32—58 |
| 2,793,438 | 5/1957 | Ashkin | 32—58 |
| 3,178,754 | 4/1965 | Cleverdon | 128—62 UX |
| 3,183,538 | 5/1965 | Hubner | 128—62 A X |

ROBERT PESHOCK, Primary Examiner